United States Patent [19]

Kummer

[11] Patent Number: 4,609,996

[45] Date of Patent: Sep. 2, 1986

[54] MEMORY ACCESS SYSTEM FOR A COMPUTER SYSTEM ADAPTED TO ACCEPT A MEMORY EXPANSION MODULE

[75] Inventor: David A. Kummer, Boca Raton, Fla.

[73] Assignee: International Business Machines Corporation, Armonk, N.Y.

[21] Appl. No.: 522,893

[22] Filed: Aug. 12, 1983

[51] Int. Cl.⁴ .............................................. G06F 13/00
[52] U.S. Cl. .................................................. 364/900
[58] Field of Search ............... 365/222; 364/200, 900; 340/703, 735, 750, 790

[56] References Cited

U.S. PATENT DOCUMENTS

| | | | |
|---|---|---|---|
| 4,028,675 | 7/1977 | Frankenberg | 364/900 |
| 4,386,773 | 7/1983 | Bronstein | 340/799 X |
| 4,471,465 | 9/1984 | Mayer et al. | 364/900 |
| 4,485,457 | 11/1984 | Balaska et al. | 364/900 |

Primary Examiner—James D. Thomas
Assistant Examiner—David L. Clark

[57] ABSTRACT

A microcomputer includes a main memory system which is accessed, substantially independantly, by the CPU and a subsystem, for example a video display subsystem. The memory system comprises a base memory and an optical add on expansion memory. When only the base memory is installed, consecutive locations have consecutively numbered addresses, and both the CPU and subsystem access individual locations. When both memories are installed, one has even numbered addresses and the other odd numbered addresses. With both memories installed, the CPU still accesses individual locations, but the subsystem addresses even addresses to obtain, for each access, data from the even address and the next higher odd address, thereby accessing a location in both memories. Thus the memory bandwidth for the subsystem is effectively doubled when the expansion memory is installed.

4 Claims, 6 Drawing Figures

MEMORY 22

| F F F F |
|---|
| F F F E |
| ⋮ |
| 8 0 0 3 (ATR) |
| 8 0 0 2 (CHAR) |
| 8 0 0 1 (ATR) |
| 8 0 0 0 (CHAR) |
| ⋮ |
| 0 0 0 2 |
| 0 0 0 1 |
| 0 0 0 0 |

FIG. 4

MEMORY 22

| 1 F F F E |
|---|
| 1 F F F C |
| ⋮ |
| 0 8 0 0 6 (CHAR) |
| 0 8 0 0 4 (CHAR) |
| 0 8 0 0 2 (CHAR) |
| 0 8 0 0 0 (CHAR) |
| ⋮ |
| 0 0 0 0 4 |
| 0 0 0 0 2 |
| 0 0 0 0 0 |

MEMORY 42

| 1 F F F F |
|---|
| 1 F F F D |
| ⋮ |
| 0 8 0 0 7 (ATR) |
| 0 8 0 0 5 (ATR) |
| 0 8 0 0 3 (ATR) |
| 0 8 0 0 1 (ATR) |
| ⋮ |
| 0 0 0 0 5 |
| 0 0 0 0 3 |
| 0 0 0 0 1 |

FIG. 5

MEMORY ACCESS SYSTEM FOR A COMPUTER SYSTEM ADAPTED TO ACCEPT A MEMORY EXPANSION MODULE

DESCRIPTION

1. Technical Field

The present invention relates to a memory access system for a computer system of the type which is arranged to accept a memory expansion module to increase its total memory capacity.

2. Background Art

The great majority of microcomputers at present marketed allow for main memory expansion by adding memory modules. The TI Home Computer, produced by Texas Instruments Corporation, starts with a main memory capacity of 16K bytes which can be expanded up to 52K bytes by adding expansion memory cards. The Olivetti M20 microcomputer has a basic 128K byte R.A.M. which can be expanded by a single expansion board to 512K bytes, and the VIC 20 machine, marketed by Commodore Business Machines Corporation has a basic memory of 5K bytes, which is expanded in steps up to 32K bytes. In these, as in all prior systems of which we have knowledge, this memory expansion does not require substantial revision of the memory addressing arrangements. All that happens is that the memory addresses for the added memory are added on top of the addresses for the base memory. Thus, if the base memory is of 128K bytes, then, with an expansion memory of 128K bytes, the base memory provides the addresses up to 128K and the expansion memory provides the addresses up from 128K to 512K. For this to happen, of course, the addressing scheme must allow for the extra address bit required for the expanded memory.

In microcomputer systems, and especially those employing a limited amount of memory, certain functions are limited by the bandwidth of the memory. The bandwidth is determined by the operational speed of the memory and the size of each location therein. The location size is determined by bus width of the system and the microprocessor data width. Most microcomputers use an 8 bit bus system which limits the memory location size to 8 bits. This limited bandwidth restricts the operation of some subsystems which access the memory system without direct CPU intervention. One such subsystem is a video subsystem for driving a CRT display. This operates essentially independently of the CPU to retrieve data from the memory system for display. In a microcomputer which shares its memory between CPU and video operations, the CPU accesses the memory in cycles between the video system cycles. With the requirement to share the memory with the CPU, and with 8 bit storage accesses, the video bandwidth can be severely limited, thereby limiting the display definition.

It is therefore, an object of the invention to provide, in a microcomputer system, a memory access system which, when an expansion memory is added to the base memory, automatically increases the memory bandwidth for a subsystem using the memory. In the embodiment of the invention to be described in detail hereinafter, the subsystem is a video subsystem. It is, however, contemplated that other subsystems, such as communications subsystems, could employ the inventive features to advantage.

DISCLOSURE OF THE INVENTION

The present invention provides a memory access system for a microcomputer which is adapted to accept a memory expansion module. The microcomputer includes a subsystem which accesses the system memory substantially independently of CPU accesses. When an expansion module is fitted, the memory access system defines addresses in one of the base or expansion memories as even address and in the other as odd addresses. Then, the CPU accesses both memories by individual location therein, but the subsystem addresses a single address from which an even location from one memory and an adjacent odd location from the other memory are fetched.

BRIEF DESCRIPTION OF THE DRAWINGS

FIG. 4 shows the arrangement of the base memory in the FIG. 1 system when the expansion module is not fitted.

FIG. 5 shows the arrangement of both the base and expansion memories when the expansion module is fitted.

FIG. 1 is a block diagram of the memory and video circuits of a microcomputer. A broken line 10 indicates an interface between the base circuits of the microcomputer, positioned to the left of line 10, and an expansion memory module, positioned to the right of line 10. Initially, we will consider the construction and operation of the base system, and thereafter the base system together with the expansion module will be discussed. Turning now to the base system, this comprises a CRT controller 11, which may be of the type MC6845 manufactured by Motorola Inc. This, is as is well known, provides memory addresses and raster timings to display images on a CRT display. A video array 12 is coupled to the CRT controller 11 and to a CRT display 13. Array 12 is responsive to control signals from controller 11 and data signals (MDO–MD7) on a data bus 14 to develop the drive signals for the CRT display 13. In addition it generates various control signals for the system. These include a memory chip select signal (MEM CS) on line 15, a character latch signal (CHAR LATCH) on line 16, a signal CPU LATCH on line 17, an attribute latch signal (ATR LATCH) on line 18, a GATE signal on line 19, an ALPHA signal on line 20 and a CPU CYCLE signal on line 21. These signals will be discussed in more detail later. A dynamic random access memory 22 is addressed either from controller 11 or CPU input addresses through a group of multiplexers 23 through 25. Memory 22 is coupled to receive data from the CPU on a bus 26 and to develop output data on a bus 27. Video data may be held in the memory as alphanumeric character data for conversion to display data, or directly as graphics display data, in which digits in the memory directly represent display elements. These modes of operation will hereinafter be called alpha (representing alphanumeric) and graphics modes respectively. Note the (EN) inputs to the latch circuits 28, 30, 31, 32, 43 and 44, and (CS) inputs to memories 22, 42 are responsive to low input signals.

Figure 1:
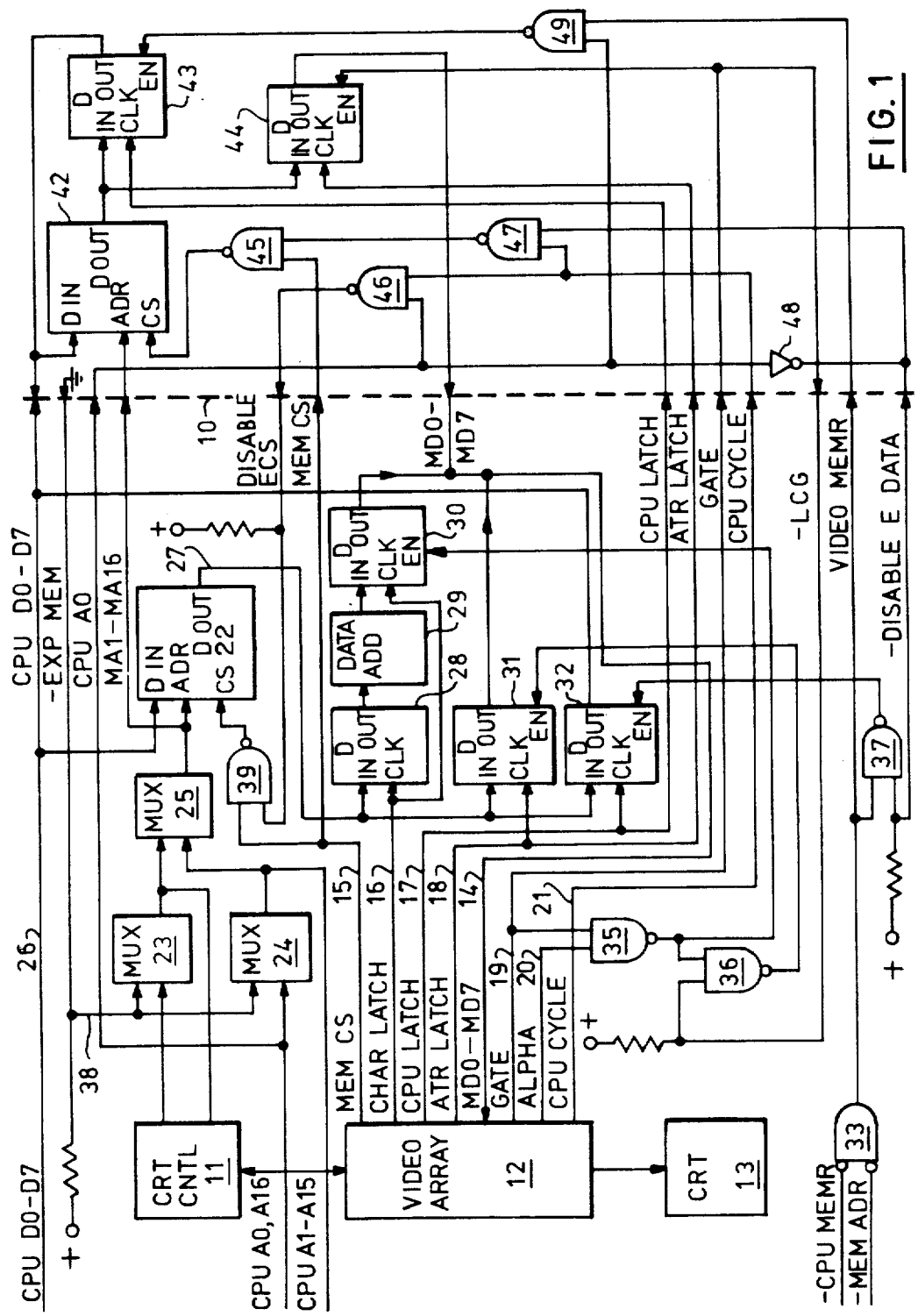
FIG. 1 is a block diagram of a microcomputer system showing the base memory and its access circuits and elements of its video subsystem together with details of a memory expansion module.

In the alpha mode, data on bus 27 is applied through a latch circuit 28 to a character generator 29, for example, a read-only memory, which, in response to this data and CRT line scan signals (not shown) develops the display data for the respective scan lines of characters to be displayed. These signals are applied through a further latch circuit 30 to the data input bus 14 to video array 12. Latch circuits 28 and 30 are controlled by the CHAR LATCH signals over line 16 from video array 10. In addition attribute data from memory 22 is applied over bus 27 to a latch circuit 31, controlled by an ATR LATCH signal on line 18. The video array 12 includes a color palette system, the principle of which was described in an article by Peter B Denes entitled 'Computer Graphics In Color' which appeared in the Bell Laboratories Record, May 1974, at pages 139 through 146. Essentially, this comprises a plurality of CPU loadable registers which are addressed by the video data from memory 22. Each register stores data bits to provide a set of CRT color drive signals representing one color. The input video data addresses different ones of these registers to provide the required sequence of color drive signals from display. In the present system in the alpha mode, a byte of attribute data from latch 31 is applied to a multiplexer in the video array 12. Thereafter, a byte of character data from latch 30 is serialized in the video array 30. The serialized bits are then applied to control the multiplexer to provide either the upper or the lower four bits of the attribute byte therein to address the color palette registers to provide, for each bit of character data, a set of four CRT drive signals, representing three colors and an intensity.

In the graphics mode, the character generator 29 is, of course, not used. Consequently, the CHAR LATCH output on line 16 is not used, and latch circuit 30 is disabled by an output (high) from NAND gate 35. Instead, the ATR LATCH signals on line 18 and an enable signal (low) from a NAND gate 36 cause successive bytes from the memory, representing video data, to pass from latch 31 to video array 12 over bus 14. These successive bytes are combined in video array 12 to address the color palette system to produce video drive signals for the CRT display 13.

Lastly, memory 22 is used not only as a video memory, but also the base memory for the C.P.U. In some video display operations and all other operations data is transferred from this memory back to the CPU. This is done through a latch circuit 32 in response to CPU LATCH signals from line 17 of the video array 12 and an enable signal from NAND gate 37. With this configuration, data from the memory passes through latch 32 to the CPU data bus (CPU D0–D7) 26.

Figure 2:
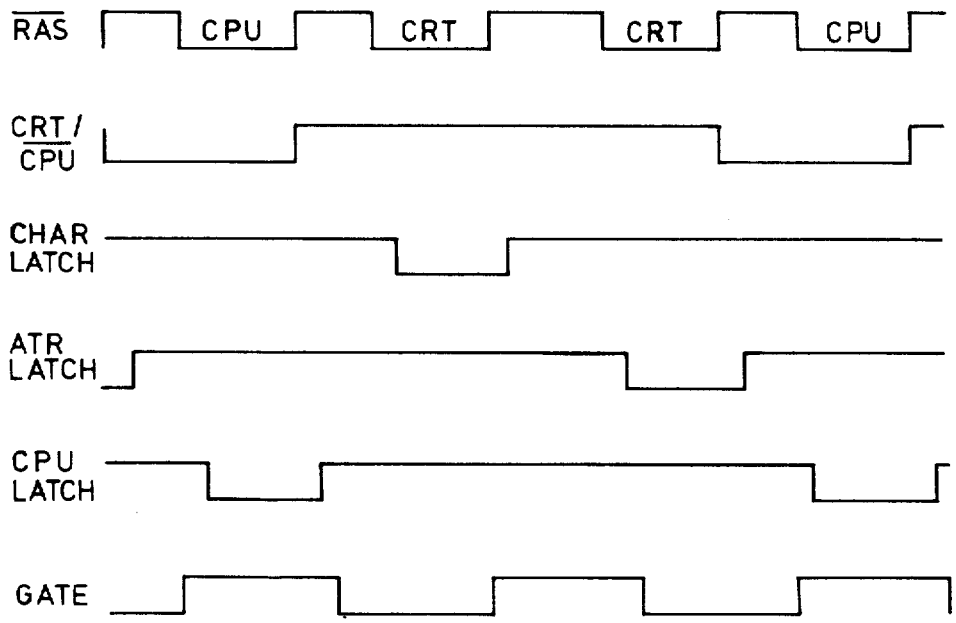
FIG. 2 is a waveform diagram showing signals occurring in the FIG. 1 system without the expansion module and with the video subsystem operating in an alphameric mode.
Figure 3:
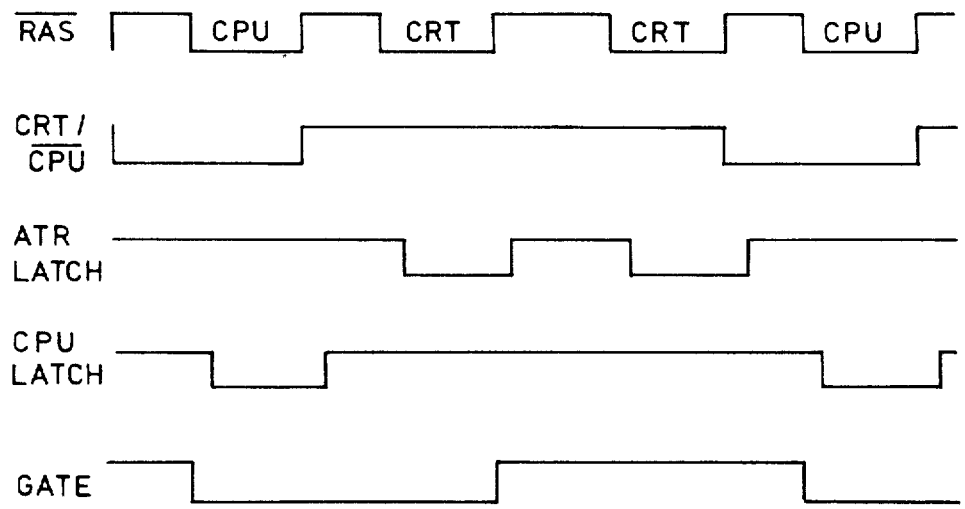
FIG. 3 is a waveform diagram showing signals occurring in the FIG. 1 system without the expansion module and with the video subsystem operating in a graphics mode.

FIGS. 2 and 3 show the waveforms of some of the signals generated in the system, without the memory expansion module fitted, for the alpha and the graphics modes respectively.

Referring firstly to FIG. 2, this shows the alpha mode. The first waveform is the memory row address strobe (RAS) signal. This, together with the column address strobe signals, times the addressing of dynamic random access stores. For simplicity these signals are not shown in FIG. 1, but they are generated by the gate array. The RAS signal is shown in FIG. 2 to indicate the timing of the memory read/write for CPU data and read for the CRT display data. It will be noted that there are two CRT memory cycles for each CPU cycle. The second waveform indicates the periods in which the CPU has access to the memory and those in which the CRT signals are derived. In the third line, the CHAR LATCH signal is shown indicating that in the first CRT memory cycle a character byte is read from the memory. The fourth line similarly shows that the ATR LATCH signal causes an attribute byte to be read in the second CRT memory cycle. The CPU LATCH signal in the fifth line shows the timing of CPU access to the memory. Lastly the bottom line shows the GATE signal from video array 12 which is used, together with the alpha signal, to provide the latch 30 enable input (low) from NAND circuit 35, and also latch 31 enable input (low) from NAND circuit 36. The GATE signal enables latch 30 when reading character data into the video array and enables latch 31 when reading attributes into the video array.

In the graphics mode, the signals are as shown in FIG. 3. Here, the RAS, CRT/CPU and CPU LATCH waveforms are the same as in FIG. 2. Now, however, the ATR LATCH on the third line, operates latch circuit 31 for both of the CRT memory cycles. The gate output from video array 12 shown at the bottom line changes, but this now has no effect on the operation since the ALPHA signal on line 20 is now forcing NAND circuit 35 high which does not generate an enable signal for latch 30. Latch 31 is always enabled since NAND circuit 36 is low.

FIG. 4 shows the memory addressing arrangement for memory 22 when the memory expansion module is not mounted. The memory has a capacity of 64K bytes which have consecutively numbered addresses, expressed in FIG. 4 in hexadecimal form, from 0000 to FFFF. A portion of the memory, including four locations 8000 through 8003, contains the video data. Adjacent locations of the video memory store character (either alpha or graphics) bytes and attribute bytes as shown. This memory requires sixteen address bits (A0 through A15) for the 64K address locations.

In order to expand the memory to 128K bytes by adding an expansion module, the normal arrangement employed is to address the base memory in the same way as shown in FIG. 4, and to add the further addresses provided by the expansion module on top of the addresses in the base memory. Thus, the base memory addresses would go from 0000 through FFFF and the expansion module addresses from 10000 through 1FFFF.

FIG. 5 shows a novel addressing scheme for the two memories in accordance with the invention. In this arrangement, memory 22 contains all the even addresses from 00000 through 1FFFE, and the expansion memory (42, FIG. 1) contains all the odd addresses from 00001 through 1FFFF. In the area of the memories used for video data, of which addresses 8000 through 8007 are shown, the character bytes (either alphanumeric or graphics) are still held in even address locations and the associated attribute bytes are still held in adjacent odd address locations. Thus, memory addressing for the video data follows the same pattern as that when only the base memory is used. This arrangement has the great advantage that video bandwidth can be doubled. Video bandwidth is determined by the speed of the memories and the size of each memory location. In the arrangement described above, using only memory 22, the memory cycles are grouped in threes, one for the CPU and two for the CRT. A typical time for these operations is 1.1μ secs. for the three cycles. In these cycles, the CPU accesses one location, and a character byte and an attribute byte are retrieved for the CRT. Now, when the memory is expanded as shown in FIG. 5, if, for the video data we regard the lowest order bit as a 'don't care' bit, then from each set of address bits we retrieve both a character and an attribute byte. This means that in the 1.1μ secs., we can now fetch two character bytes and two attribute bytes for the CRT in addition to the single byte access for an 8 bit microprocessor CPU. Thus, the CRT system can provide a considerably higher definition display including more alphanumeric or graphics information.

Turning back again to FIG. 1, we will now assume that the memory expansion module is coupled to the microcomputer. This adds memory 42, and latch circuits 43 and 44 to the system. Latch circuit 43 couples the data output bus of memory 42 to the CPU data bus 26, and therefore equates to latch circuit 32 in the base system. Latch circuit 44 couples the data output bus of memory 42 to the video array data bus 14 and accordingly equates to latch 31 in the base system.

Figure 6:
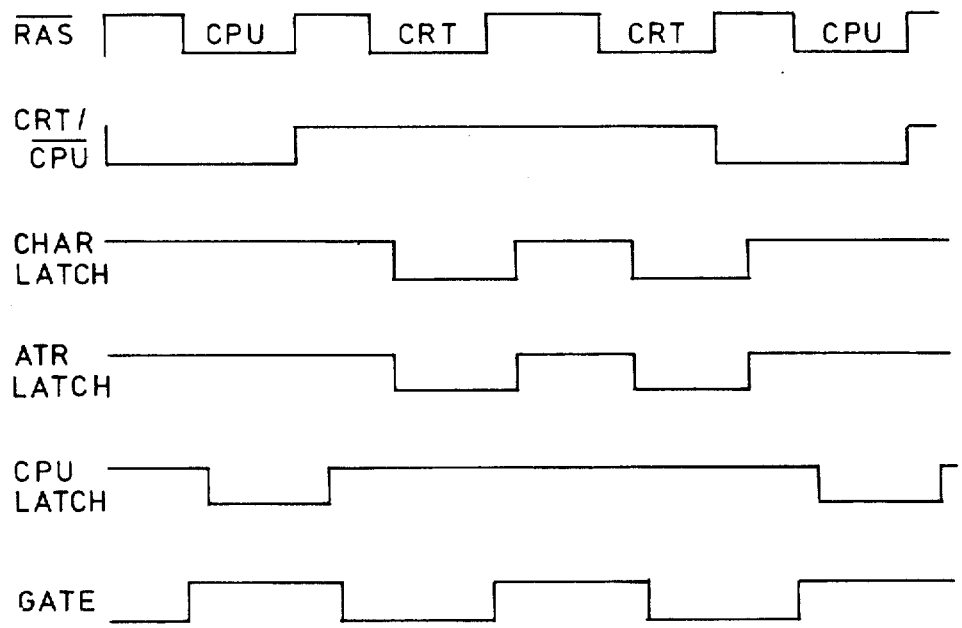
FIG. 6 is a waveform diagram showing signals occurring in the FIG. 1 system when the expansion module is fitted.

Looking now at the addressing scheme, we have 128K bytes of memory which require 17 address bits A0 through A16 to access all of them. However, as all of the even addresses are in the base memory 22 and the odd addresses are in memory 42, all the lowest order bit, A0, does is to select one of the memories. In other words, if A0 is '0', then memory 22 is selected and if it is '1' than memory 42 is selected. Now, if we add the highest order bit A16 to bits A1 through A15, each memory is again addressed by 16 bits. This is achieved for the CRT addresses by multiplexer 23, and for CPU addresses by multiplexer 24. Each of these multiplexers receives a control input from line 38. When the expansion memory module is plugged in, this line is automatically reduced from a high state to a low state as it is earthed at the expansion module end. Multiplexer 23 receives address bits A0 and A16 from the CRT controller and, when line 38 is high, passes A0 and when this line is low, passes A16. Accordingly, when the expansion module is mounted, the input to multiplexer 25 from the CRT controller comprises addresses A1 through A15 from the lower address output of controller 11, and A16 from multiplexer 23. Multiplexer 24 operates in a similar manner to multiplexer 23, only for the CPU addresses. It receives the CPU A0 and A16 addresses and, when the memory expansion module is fitted, passes the A16 address to multiplexer 25, which also receives the CPU A1 through A15 addresses. Multiplexer 25 is responsive to a CRT/CPU signal, shown in FIGS. 2, 3 and 6, to pass either the CRT or the CPU address to memory 22 when only this memory is present or to both memories when the expansion module is fitted through the MA1-MA16 link. This leaves the selection of the memories for odd and even addresses by the A0 address bit, which is achieved by controlling the chip select (CS) inputs to the memories from a memory chip select (MEM CS) output from the video array. The CS input of memory 22 is driven from a NAND gate 39 which, in the absence of the expansion module, has one input, on a DISABLE ECS line, always high. Thus with no expansion module, the input to the CS input is the inverse of the MEM CS output. This output goes high for each memory access time, givin9 a low input to the memory CS to enable the memory. With both memories installed, what is required is to select both memories for each CRT access and either one or the other, in accordance with the value of the A0 bit, for each CPU access.

Taking the CRT addressing first, the memory 22 CS input is fed from NAND gate 39, as before, and the memory 42 CS input is fed from a NAND gate 45. Both have one input coupled to receive the MEM CS output of the video array 12. For the CRT accesses, the second inputs of each must be high. The second input to NAND gate 39 comes from a NAND gate 46. With no CPU CYCLE input to this module from the video array, the output of NAND gate 46 is high. The second input to NAND gate 45 is delivered from a NAND gate 47. This, with no input from the CPU CYCLE line, also provides a high output. Thus, for CRT accesses, the CS inputs to both memories are raised to enable the memories together.

For CPU accesses, the CPU CYCLE input to the expansion module from the video array 12 is high. Therefore, for a CPU A0 input to NAND gate 46 of '1' during a CPU cycle, the output from NAND gate 46 goes low, thereby disabling memory 22 through NAND gate 39. The CPU A0 line passes through an inverter 48, so this input is low, giving a high output to enable memory 42 through NAND gate 45. Clearly, when the CPU A0 line carries a '0' bit, this situation is reversed, so that memory 22 is enabled and memory 42 disabled.

Data to be written into the memories is applied from the CPU over the CPU D0-D7 lines. When the expansion module is not present, the DISABLE ECS line to NAND gate 39 is always high, so when the MEM CS line 15 is raised, the memory 22 can be written into the location addressed, through multiplexors 24 and 25, by the CPU A0-A15 signals. When the expansion module is fitted, and the CPU wishes to write to an even location, the DISABLE ECS line is forced high as the CPU A0 line to NAND gate 46 is low allowing the write to occur in memory 22. At this time, the inverted A0 signal from inverter 48 forces NAND gate 47 output high to force the output of NAND gate 45 low. Thus, memory 42 is disabled and can not be overwritten. When the CPU wishes to write to an odd location, the CPU A0 line is high, so memory 42 is selected from NAND gate 45 and memory 22 is disabled thereby preventing distruction of its data.

Data read from memories 22 and 42 for the CPU passes through either latch circuit 32 from memory 22 or latch circuit 43 from memory 42. Latch circuit 32 is enabled from the output of a NAND gate 37. Without the expansion module, the lower input of this gate is always high, so gate 37 enables latch circuit 32 in response to a signal on the VIDEO MEMR line resulting from a negative CPU memory read signal and negative memory address signal applied to a NOR gate 33 from the CPU. With the expansion memory in place, the NOR gate 33 output on the VIDEO MEMR line is applied to both NAND gates 37 and 49. The other inputs to these NAND gates come from the CPU A0 line and the output of inverter 48, through the - DISABLE E DATA line respectively. Consequently, when the CPU A0 line carries a '1' bit, latch circuit 43 is enabled through NAND gate 49, and latch circuit 32 is disabled through NAND gate 37. When the CPU A0 line carries a '0' bit, latch circuit 32 is then enabled through NAND gate 37 and latch circuit 43 disabled through NAND gate 49. Thus, data is read from either of these latches to the CPU D0-D7 line.

For the CRT data, as has been mentioned above, the memories are accessed together so that character data, alpha or graphics, is retrieved from memory 22, and attribute data from memory 42. The character data is latched into latch circuits 28 and 31 for both alpha and graphics data. This is because, as can be seen at the third and fourth lines of FIG. 6, the CHAR. LATCH and ATR. LATCH signals from video array 12 now coincide. The attribute data from memory 44 is latched into latch circuit 44 which is also clocked by the ATR LATCH data from video array 12. Data from latch circuit 28 is passed to the character generator 29, as before, and the character line data from the generator is latched into latch circuit 30. Each of these latch circuits is read out by means of a low signal applied to its enable input. The GATE signal from video array 22 on line 20, shown at the bottom line of FIG. 6, controls the read out of firstly latch circuit 30 or 31 and then latch circuit 44.

In the alphanumeric mode, the ALPHA signal on line 20 from the video array 22 is high. Accordingly, when the GATE signal is high, the output of NAND circuit 35 is low, enabling latch circuit 30 to output its data to the MD0-MD7 bus into the video array. When the GATE signal subsequently goes low, latch circuit 44 is enabled to deliver its data to the MD0-MD7 bus and, as the output of NAND gate 35 is now high, latch circuit 30 is disabled. During this time NAND gate 36, which receives the GATE signal, fed back from the expansion module on a -LGG line, together with the output of NAND gate 35, never provides a low output, so latch circuit 31 remains disabled. Thus, a character byte is read from latch circuit 30 followed by an attribute byte from latch 44 for each CRT cycle.

In the graphics mode, the ALPHA signal is low. Accordingly, the output of NAND gate 35 is always high, so latch 30 is never enabled. When the GATE signal is high, this signal, returned from the expansion module on the -LGG line, together with the high output from NAND gate 35, provide a low output from NAND gate 36. This enables latch circuit 31 to read out its graphics character data to the MD0-MD7 bus. Thereafter, when the GATE signal goes low, latch circuit 31 is disabled and latch circuit 44 enabled to provide the corresponding attribute data.

In summary, what has been shown is, in a microcomputer system, a memory access arrangement which, when an expansion memory is added treats the main memory locations as the even addresses and the expansion memory locations as the odd addresses. The microcomputer system includes a video subsystem which accesses the memory in cycles between CPU access cycles. When the expansion memory is added, the video subsystem, in each of its access cycles, addresses the memory to retrieve data from both an even and an adjacent odd address, thereby doubling the data rate for each of these cycles. This allows higher definition displays.

It is, of course, clear that other subsystems, for example communications subsystems, which require access to memory substantially independently of the CPU, may with advantage use the increased memory bandwidth provided by the invention. In the embodiment described above, for each three operating cycles, one was used by the CPU and two by the video system to enhance display definition. Equally well, these three cycles could be used by the CPU, the video subsystem and a communications subsystem respectively. Thus, with the expansion memory installed, the video subsystem would have the same bandwidth as if it used two of the three cycles with single byte transfer and in addition the communications subsystem has its own cycle with the double byte access rate.

While the invention has been particularly shown and described with reference to preferred embodiments thereof, it will be understood by those skilled in the art that various other changes in form and detail may be made without departing from the spirit and scope of the invention.

I claim:

1. A computer system comprising:
   (a) a central processor unit (CPU) having a parallel n+1 bit memory address output comprising bits A(0) through A(n), of which bits A(0) and A(n) are respectively the lowest and highest order bits, and n is an integer;
   (b) a processing subsystem (PS) having a parallel n+1 bit memory address output comprising bits A(0) through A(n), of which bits A(0) and A(n) are respectively the lowest and highest order bits;
   a memory address logic system (MALS) having logic inputs, and address inputs coupled to said memory address outputs of the CPU and the PS, and having an n bit memory address output;
   (d) a base memory having $2^n$ locations and an n bit address input coupled to the memory address output of said MALS;
   (e) a memory expansion module (MEM) comprising an expansion memory having $2^n$ locations and an n bit address input, and a control system having control outputs;
   (f) coupling means for removably coupling said MEM to said MALS, including means for removably coupling said address input of the expansion memory to the memory address output of said MALS, and for removably coupling the control outputs of said control system to the logic inputs of said MALS;
   (g) said MALS being switched from a first condition to a second condition on connection of the control outputs of the control system of said MEM through said coupling means to said logic inputs, and being responsive, in said first condition, to address bits A(0) through A(n-1) in each set of address bits from the CPU or from the PS to address an individual location in the base memory, and being responsive, in said second condition, to each set of address bits A(0) through A(n) from the CPU to address an individual location within one of the two memories or to bits A(1) through A(n) in each set of address bits from the PS to simultaneously address a pair of locations, comprising a location in each of said memories.

2. A computer system according to claim 1, in which said base memory and said expansion memory each have a data output, and said CPU and said PS each have a data input, and including first data latch means connected between the data output of the base memory and the data input of th CPU, second data latch means connected between the data output of the base memory and the PS, the third data latch means connected between the data output of the expansion memory and, through said coupling means, to the data input of the CPU, fourth data latch means connected between the data output of the expansion memory and, through said coupling means, to the data input of the PS, each of said data latch means having a enable input, and latch control means coupled to the enable input of said second data latch means and, through said coupling means, to the enable input of said fourth data latch means, said latch control means being effective on said simultaneous addressing of a pair of locations to enable said second data latch means to transfer data from said base memory to the PS and thereafter to enable said fourth data latch means to transfer data from the expansion memory to the PS.

3. A computer system according to claim 2, in which said latch control means is further coupled to the enable inputs of said first and third data latch means and is effecive, on addressing of a single one of said memories, to enable a single one of said data latch means coupled to the addressed memory.

4. A computer system according to claim 1, in which said MALS includes a first multiplexer coupled to the A(0) and A(n) address outputs of the CPU and a second multiplexer coupled to the A(0) and A(n) address outputs of the PS, said multiplexers being coupled to a common control line switched from a first condition to a second condition on connection thereto of a control output of the control system of said MEM through said coupling means, thereby to select the A(0) bits or the A(n) bits respectively for memory addressing.

* * * * *